(12) United States Patent
Heer et al.

(10) Patent No.: US 12,406,200 B2
(45) Date of Patent: Sep. 2, 2025

(54) CONFIGURABLE QUANTUM-COMPUTING CONTROL SYSTEM

(71) Applicant: ZURICH INSTRUMENTS AG, Zürich (CH)

(72) Inventors: Flavio Heer, Lufingen (CH); Hussein Kassir, Zürich (CH); Niels Haandbaek, Zug (CH); Sadik Hafizovic, Zürich (CH)

(73) Assignee: ZURICH INSTRUMENTS AG, Zürich (CH)

( * ) Notice: Subject to any disclaimer, the term of this patent is extended or adjusted under 35 U.S.C. 154(b) by 569 days.

(21) Appl. No.: 17/917,080

(22) PCT Filed: Apr. 6, 2020

(86) PCT No.: PCT/EP2020/059744
§ 371 (c)(1),
(2) Date: Oct. 5, 2022

(87) PCT Pub. No.: WO2021/204345
PCT Pub. Date: Oct. 14, 2021

(65) Prior Publication Data
US 2023/0153675 A1    May 18, 2023

(51) Int. Cl.
*G06N 10/40*    (2022.01)
(52) U.S. Cl.
CPC .................... *G06N 10/40* (2022.01)
(58) Field of Classification Search
USPC ....................................................... 716/100
See application file for complete search history.

(56) References Cited

U.S. PATENT DOCUMENTS 3,596,197 A    7/1971   Chorney
7,340,357 B2   3/2008   Ammerman et al.
(Continued)

OTHER PUBLICATIONS

Yehan Liu, "Quantum Feedback Control of Multiple Superconducting Qubits", XP055767142, Retrieved from the Internet: URL:https://qulab.eng.yale.edU/documents/theses/yehan_thesis.pdf [retrieved on Jan. 20, 2021], Dec. 31, 2016, pp. 1-181.
(Continued)

*Primary Examiner* — Brian Ngo
(74) *Attorney, Agent, or Firm* — GREENBLUM & BERNSTEIN, P.L.C.

(57) ABSTRACT

A system for controlling a quantum processor includes a system controller having a plurality of input channels and output channels connected to qubit readout instruments and qubit control instruments. The system controller is implemented at least in part as an FPGA. It forms a register bank for receiving the data from the input channels, a feedback block for processing the data from the register bank, and an output interface for sending the results of the feedback block to the control instruments. The feedback block can be programmed by an FPGA configuration device. The FPGA configuration device is able to process various types of feedback block definitions, which e.g. describe lookup tables, minimizers, Boolean operations, etc. A configuration device includes a system compiler agnostic of the specific implementation of the feedback block for controlling the experiments and the operation of the instruments.

26 Claims, 3 Drawing Sheets

(56) References Cited

U.S. PATENT DOCUMENTS

| | | | |
|---|---|---|---|
| 9,100,030 | B1 | 8/2015 | Haisch |
| 10,748,082 | B2* | 8/2020 | Rigetti ................ G06F 13/4068 |
| 2007/0067123 | A1 | 3/2007 | Jungerman |
| 2016/0267032 | A1* | 9/2016 | Rigetti .................. G06N 10/40 |
| 2018/0260245 | A1 | 9/2018 | Smith |
| 2019/0049495 | A1 | 2/2019 | Ofek et al. |
| 2021/0313973 | A1* | 10/2021 | Cohen ...................... G06N 3/04 |
| 2022/0084085 | A1* | 3/2022 | Rigetti .............. H04M 15/8214 |
| 2022/0164693 | A1* | 5/2022 | Tezak ..................... G06N 10/40 |
| 2024/0193451 | A1* | 6/2024 | Matsuura ............... G06N 10/20 |

OTHER PUBLICATIONS

"Keysight Technologies: "M3302A/M3300A PXIe Arbitrary Waveform Generator and Digitizer Combos with Optional Real-Time Sequencing and FPGA Programming"", XP055767139, Retrieved from the Internet: URL:https:// www.keysight.com/us/en/assets/7018-05401/ technical -overviews/5992-1807.pdf [retrieved on Jan. 20, 2021], Dec. 2, 2019, pp. 1-3.

"Keysight Technologies: "High-speed Signal Processing with Low Latency Feedback System for Quantum Bit Evaluation"", XP055767145, Retrieved from the Internet: URL:https:// www.keysight.com/us/en/ assets/ 7018-05850/ flyers/ 5992-2458.pdf [retrieved on Jan. 20, 2021], Dec. 12, 2019, pp. 1-3.

C. A. Ryan et al., "Hardware for Dynamic Quantum Computing", arXiv:1704.08314v1, Apr. 28, 2017, PP.

P. Das et al., "A Scalable Decoder Micro-architecture for Fault-Tolerant Quantum Computing", arXiv:2001.06598v1, Jan. 18, 2020, PP.

"Static timing analysis", Wikipedia, version dated Oct. 21, 2019.

"Quantum error correction", Wikipedia, version dated Feb. 7, 2020.

"VDHL", Wikipedia, version last edited Nov. 7, 2019.

"How to Create a Process with a Sensitivity List in VHDL", Article dated Aug. 15, 2017 from https://vhdlwhiz.com/sensitivity-list, printed Dec. 4, 2021.

Int'l Search Report (Form PCT/ISA/210) conducted in Int'l Appln. No. PCT/EP2020/059744 (Jan. 28, 2021).

Int'l Written OpinionSearch Report (Form PCT/ISA/237) conducted in Int'l Appln. No. PCT/EP2020/059744 (Jan. 28, 2021).

* cited by examiner

CONFIGURABLE QUANTUM-COMPUTING CONTROL SYSTEM

TECHNICAL FIELD

The invention relates to a system for controlling a quantum processor.

BACKGROUND ART

A system for controlling a cryogenic quantum processor typically comprises a system controller having a plurality of input channels and output channels, a plurality of qubit readout instruments connected to the input channels, and a plurality of qubit control instruments connected to the output channels.

The qubit control instruments are adapted to send signals into the quantum processor to set up or adjust its state while the qubit readout instruments probe the quantum processor and read out one or more of the qubits at certain times, e.g. for result sampling or error correction.

The system controller provides a feedback mechanism controlling the control instruments in response to the signals measured by the readout instruments. It must therefore by fast and deterministic. Further, in order to adapt it to the requirements of the specific quantum processor and its desired method of operation, the system controller t should configurable by the user.

A system of this type is e.g. described by C. A. Ryan et al. "Hardware for Dynamic Quantum Computing", arXiv: 1704.08314v1, 28 Apr. 2017.

The feedback implemented by the system controller can e.g. be used for state initialization as described in the reference above and/or for Quantum Error Correction (QEC) as e.g. described e.g. by P. Das et al. "A Scalable Decoder Micro-architecture for Fault-Tolerant Quantum Computing", arXiv:2001.06598v1, 18 Jan. 2020.

DISCLOSURE OF THE INVENTION

The problem to be solved by the present invention is to provide a system of the type above that allows the experimenter to set up the system controller in a versatile yet simple manner.

This problem is solved by the system of claim 1.

Accordingly, the system comprises at least the following elements:
- A system controller having a plurality of input channels and output channels: This is the part of the device that implements the feedback logic between the measured signals from the quantum processor and the signals to be sent to the quantum processor. Each of the input channels carries address data and measurement data, whose roles are described below.
- A plurality of qubit readout instruments connected to the input channels of the system controller: The readout instruments comprise the circuitry to read one single qubit or combinations of qubits from the quantum processor and to convert them into measurement data. In addition, they may comprise storage for address data to be sent along with the measurement data through their respective input channel to let the system controller know where the measurement data is to be stored.
- A plurality of qubit control instruments connected to the output channels: The control instruments comprise circuitry to control the qubits of the quantum processor.

The system controller comprises at least one FPGA, i.e. a programmable gate array. This one or more FPGA form(s) at least the following parts of the system controller:
 a) An input interface: The input interface comprises address decoder circuitry connected to the input channels.
 b) A register bank: The register bank comprises a plurality of registers connected to the input interface.
 c) A programmable feedback block: The feedback block has inputs connected to the register bank, and it has outputs. It implements the feedback logic of the system controller.
 d) An output interface: The output interface connects the outputs of the feedback block to the output channels.

The input interface is adapted to send the measurement data of the input channel to one of the registers of the register bank as specified by the address data in a given input channel. In other words, the readout instruments are able to specify the register(s) into which the measurement data is to be stored.

The system further comprises an FPGA configuration device connected to at least one FPGA. The FPGA configuration device is adapted to carry out at least the following functions:
- Receiving at least one feedback block definition: This is a definition of the functions to be carried out by the feedback block. This feedback block definition may e.g. comprise a textual configuration description (e.g. in VHDL) defining the logical configuration of at least part of the feedback block, a bit stream configuration to be fed directly to the FPGA, and/or a configuration dataset to be stored into registers formed by the configured FPGA.
- Programming a section of the FPGA to form said feedback block in accordance with the feedback block definition. In other words, the FPGA configuration device translates, where necessary, the feedback block definition and feeds it to the FPGA, For example, it generates a bit stream from a textual logic definition and feeds it to the FPGA, and/or it forwards a received bit stream to the FPGA, and/or it feeds a configuration dataset into registers formed by the configured FPGA.

Note: the number of readout instruments, control instruments, and registers are typically different from each other.

Advantageously, the FPGA configuration device has several "modes" for programming said section of the FPGA. The different modes are adapted to program the feedback block to implement different algorithms for connecting the registers to the outputs of feedback block, and they can be optimized to make it easy for the user to specify the elements or parameters of the algorithm(s) to be used.

In particular, the FPGA configuration device may have a "LUT-mode". When in the LUT mode, the FPGA configuration device is adapted to program the section of the FPGA to form a lookup table. This lookup table has a selection input connected to the register bank and a data output connected to the output interface. It can be used to implement the feedback as a simple lookup table that provides the values (or parts thereof) to be sent to some or all of the control instruments as a function of the values in some or all of the registers.

The FPGA configuration device may also have an "ML-mode". When in the ML mode, the FPGA configuration device is adapted to program the section of the FPGA to implement a machine learning model. This model may advantageously implement an artificial neural network. Alternatively, or in addition thereto, it may implement at least one of a decision tree, a support vector machine, a regression analyzer, a Bayesian network, or a genetic algorithm.

The FPGA configuration device may also have an "FPGA direct programming mode". When in this mode, the FPGA configuration device is adapted to receive gate-level instructions for programming the section of the FPGA. Advantageously, the FPGA configuration device is adapted to receive a set of VHDL instructions and to use these instructions for programming the FPGA in said section.

In another embodiment, the system may further comprise a co-processor, such as a GPU or other hardware optimized for numerical processing as e.g. described in more detail below.

The coprocessor is separate from the FPGA circuitry of the system controller and advantageously not an FPGA. It is connected to the FPGA. In this case, the FPGA configuration device may also have a "coprocessor programming mode". When in this mode, the FPGA configuration device is adapted to program the section of the FPGA to exchange data with the coprocessor in order to execute its calculations, at least in part, on the coprocessor.

The FPGA configuration device may also have one or more other modes as specified below.

In one embodiment, the FPGA configuration device may be adapted to carry out the following steps:
Merge the "feedback block definition" with information descriptive of the input interface, the register bank, and the output interface in order to generate FPGA configuration data. Such FPGA configuration data may e.g. be a series of VHDL instructions and/or a series of configuration values to be sent into the configuration registers of the FPGA.
Program the at least one FPGA according to said FPGA configuration data in order to form the input interface, register bank, programmable feedback block, and output interface in said at least one FPGA.

This allows to greatly reduce the complexity of configuring the FPGA because the programming of its standard parts, i.e. of the input interface, register bank, programmable feedback block, and output interface, are taken care of by the FPGA configuration device. The user only needs to concentrate on the part that controls the quantum processor's functionality, i.e. on the feedback block.

In another important embodiment, the system comprises a system configuration device connected to the readout instruments and to the control instruments. The system configuration device is adapted to program the readout instruments and the control instruments. Advantageously, the system configuration device is a device separate from the FPGA configuration device.

Advantageously, each readout instrument comprises at least one address memory storing the address to be transmitted as address data together with the measurement data on the input channel connecting the readout instrument to the system controller. This address memory may e.g. be part of a program memory storing instructions to be executed by the readout instrument.

The system configuration device may be adapted to write the address into the address memory. This allows the system configuration device to define the register(s) a readout instrument is to write into.

The system configuration device may comprise a delay input connected to the FPGA configuration device for receiving a value descriptive of the time delay between the input channels and the output channels in the current configuration of the system controller. The system configuration device may e.g. use this time delay for synchronizing the operation of the control instruments and the readout instruments.

In that case, the FPGA configuration device is adapted to calculate the time delay as a function of the feedback control definition, i.e. it analyses the feedback control definition and calculates the time delay therefrom. In a general case, the FPGA configuration device is adapted to process at least two possible feedback control definitions that result in two different time delays.

In a further embodiment, each register not only comprises a "register data output" carrying a signal indicative of the data stored in the register, but it also comprises a "new value output". The new value output carries a signal indicative of a write event into the register, i.e. the new value output changes state when one of the readout instruments has issued a write command into the respective register by transmitting the register's address through the address data in its input channel.

Hence, the new value output changes state and becomes active even if the actual value in the register does not change.

Both, the register data output as well as the new value output of the registers, are connected to the feedback block. This allows the feedback block to recognize the time when a recalculation of its outputs may be required.

In particular, the feedback block may be adapted to initiate a recalculation of at least some of its outputs if at least some of the new value outputs flags a write operation in its register.

Advantageously, the feedback block may comprise a sensitivity list storing a sensitivity information indicative of a subset of the registers and be adapted to initiate a recalculation if the new value output of at least one register of the subset flags a write operation in its register. In this case, advantageously, the FPGA configuration device may be adapted to set this sensitivity information. The sensitivity information may be a function of the feedback block definition, i.e. the feedback block definition forms an explicit or implicit declaration of the registers the feedback block (or part thereof) depends on.

The invention also relates to the use of such a system for controlling a quantum processor.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Overview

Figure 1:
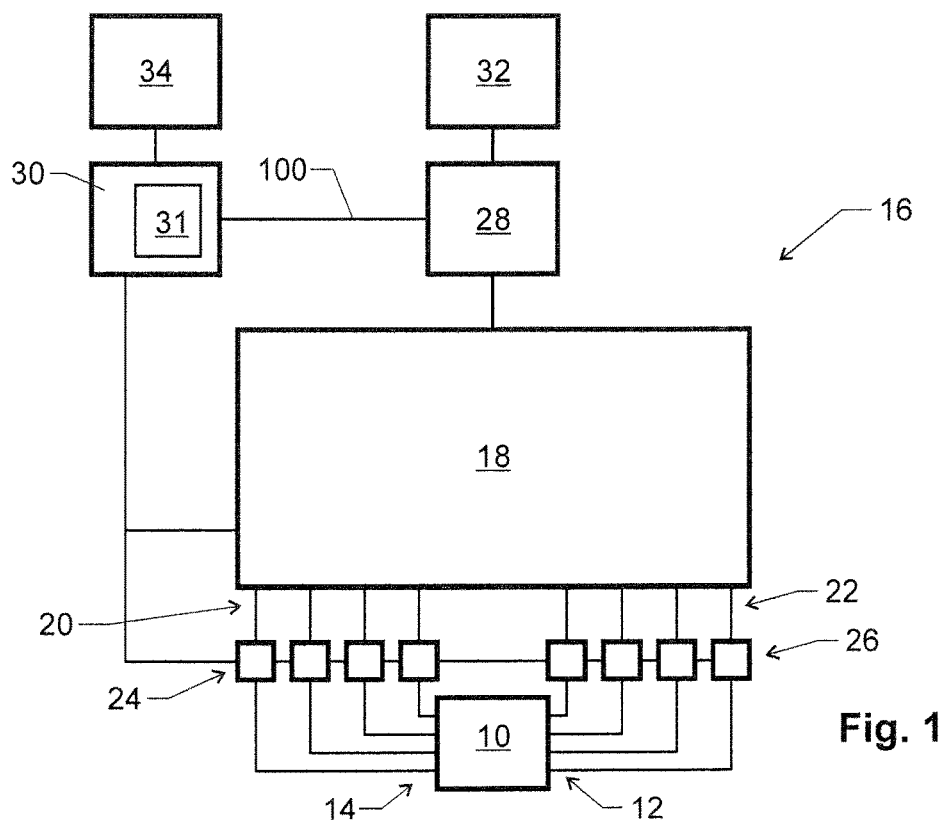
FIG. 1 shows a general overview of an embodiment of the system.

FIG. 1 shows an overview of an embodiment of a system for controlling a quantum processor 10.

Quantum processor 10 may be implemented in any suitable quantum processor technology. It has a first plurality of interacting qubits, a second plurality of inputs 12 for setting the states of the qubits, and a third plurality of outputs 14 for detecting the states. Typically, the first, second, and third pluralities will differ in numbers.

The system 16 has the purpose to set the qubits, to sample the qubits, and/or to control the cubits, e.g. for setting up the state of the cubits, for reading results from quantum processor 10, or for error correction in QEC scheme as mentioned above.

System 16 comprises a system controller 18 having a plurality of input channels 20 and a plurality of output channels 22. FIG. 1 shows four of each of these channels, but that number will, in most applications, typically be larger, and the numbers of input channels and output channels will typically differ.

The outputs 14 of quantum processor 10 are connected to qubit readout instruments 24, and each readout instrument 24 is connected to system controller 18 by means of at least one of the input channels 20.

Typically, each readout instrument 24 generates pulses to be fed to quantum processor 10 (not shown in the figures) and then measures the response at the outputs 14.

The output channels 22 of system controller 18 are connected to qubit control instruments 26, and each control instrument is connected to at least one of the inputs 12 of quantum processor 10.

Again, there may be any suitable numbers of readout instruments 24 and the control instruments 26.

The system further comprises an FPGA configuration device 28 for configuring a user-configurable section of system controller 18.

It may also comprise a system configuration device 30 connected to the readout instruments 24, the control instruments 26, and/or the system controller 18 and adapted to program them as described in more detail below.

The system may further e.g. comprise a first higher-level control device 32 for controlling FPGA configuration device 28 and/or a second higher-level control device 34 for controlling system configuration device 30.

In operation, system controller 18 controls and synchronizes the control instruments 26 for setting up and/or correcting the qubit states of quantum processor and the readout instruments 24 for obtaining signals. FPGA control device 28 controls the setup of the feedback logics between the input channels 20 and the output channels 22. System configuration device 30 controls the operating parameters of the readout instruments 24 and the control instruments 26 as well as the process control incorporated in system controller 18.

Possible designs and functionalities of the individual components will be described in more detail in the following sections.

System Controller

Figure 2:
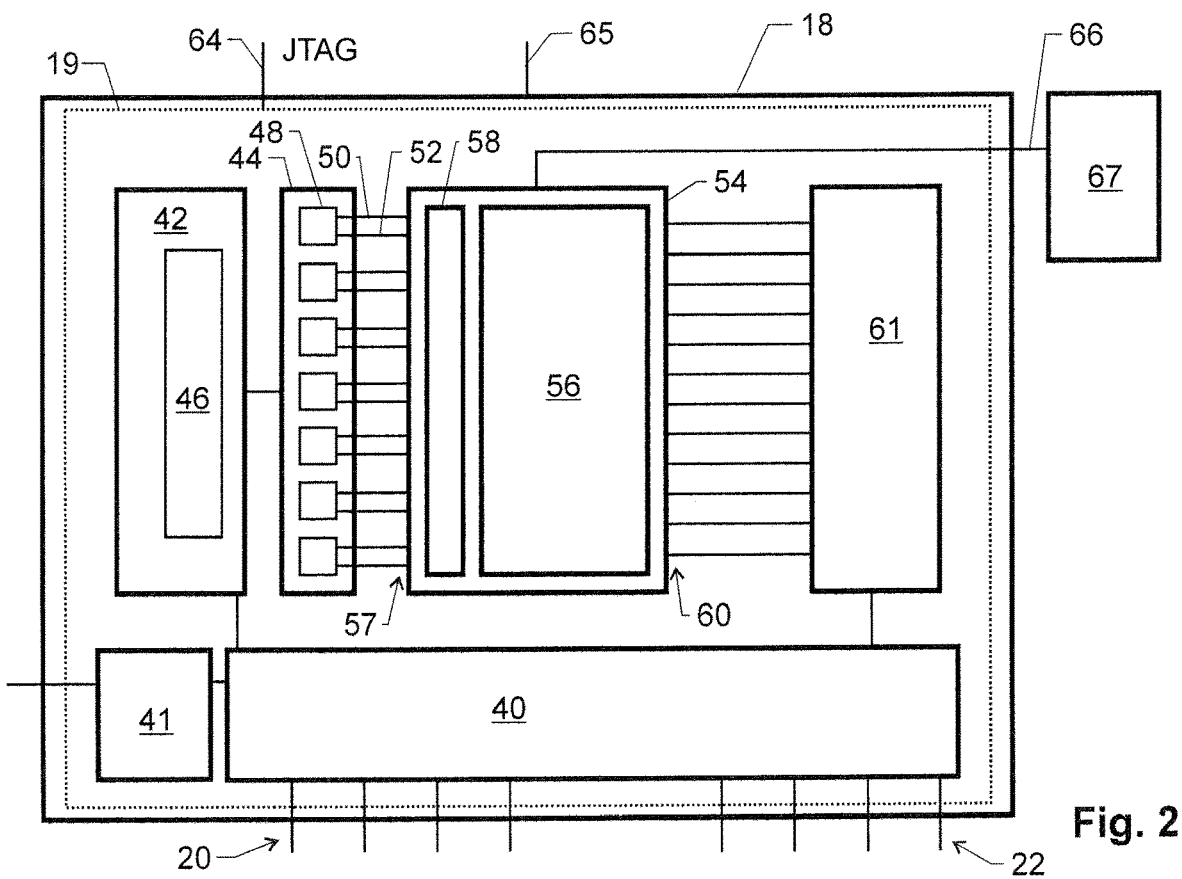
FIG. 2 is a more detailed view of an embodiment of the system controller.

FIG. 2 shows a more detailed view of an embodiment of system controller 18.

Typically, system controller 18 is implemented, at least in part, as an FPGA 19, for the high speed, high degree of parallelism, and the well-defined delay time of such FPGA circuitry.

In particular, it comprises a communication and synchronization section 40, which forms the interface for the input channels 20 and the output channels 22. In particular, it serializes and deserializes data, it feeds a common, global clock signal to each channel 22, 20, and it handles synchronization signals at each channel 22, 20.

Communication and synchronization section 40 may also comprise an experiment controller 41 to control a series of experiments. Its role will be described below.

As will be described below, the input channels 20 carry address data to and measurement data. Typically, the address data is a digital data value indicative of the address of one of several registers, as described below, and the measurement data is a binary value describing the result of a measurement.

The address data and measurement data are fed to an input interface 42, which controls a register bank 44.

Input interface 42 comprises address decoder circuitry 46 for decoding the address data in order access the appropriate register 48 in register bank 44. The digital data is then stored in the register 48 specified by the address data.

As above, even though FIG. 2 shows eight registers 48, this is for illustration purposes only. The actual number of registers in a device may be different and will typical be larger. Typically, there is a least one register per qubit of quantum processor 10. Typically, there are at least 7 registers, in particular at least 100 registers.

Each register 48 has two outputs:

A "data output" 50 carries a signal indicative of the value stored in the register, e.g. a logical 1 if the register stores a 1-value and a logical 0 if the register stores a 0-value.

A "new value output" 52 carries a signal indicative of a write event into the register. A "write event" is a write operation generated by an input channel 20 sending data to the respective register even if the actual value of the register is not changed by the operation. In other words, each new value output 52 flags the occurrence of a write operation in its register 48. The new value output may e.g. be a binary signal set into an "on" state upon a write operation and reset e.g. after the feedback block (to be described below) has calculated its output values. Alternatively, and typically, the new value output may be reset after a predefined time interval, typically one clock cycle.

Register bank 44, i.e. the data outputs 50 and the new value outputs 52, is connected to a programmable feedback block 54.

In the shown embodiment, feedback block 54 is embodied as FPGA circuitry and implements the algorithm used to generate the values for the output channels 22 from the values in register bank 44. It will be described in more detail below. But in one embodiment, it may e.g. comprise a lookup table 56 as shown.

Feedback block 54 comprises inputs 57 connected to register bank 44.

In addition, feedback block 54 may comprise a sensitivity list 58 storing a sensitivity information. This sensitivity information may e.g. be a series of bits, with each bit corresponding to one of the registers 48, and/or it may be a list of register addresses.

If, for example, the new value output 52 of at least one register 48 flags that a write operation has occurred in the register and the corresponding bit in sensitivity list is 1 (or the register address is in the list of register addresses), feedback block 54 will recalculate the values at its outputs 60 from the values at its inputs 57.

In another example, feedback block 54 will recalculate the values at its output 60 only if the new value output 52 of all the registers 48 that are specified in the sensitivity list 58 flag a change.

In yet another embodiment, the sensitivity list may specify yet another logic combination of the new value outputs 52 that is required to trigger a recalculation.

There may be several such sensitivity lists, each for a different purpose. For example, one for the initialization phase and second one for the QEC phase.

In more general terms, the sensitivity information specifies a "subset" of the registers 48, and feedback block 54 is adapted to initiate a recalculation, if a given combination (such as an "and" combination or an "or" combination or yet another type of logical combination) of this subset flags a write operation in the respective register(s).

The outputs 60 of feedback block 54 (which also form the inputs of output interface 61) are connected to an output interface 61, where they are converted to signals to be fed via communication and synchronization section 40 to the output channels 22.

Advantageously, each output 60 is a one-bit or multibit value to be transmitted to a specific control instrument 26. Output interface 61 is adapted to send each one of these values to their respective control instrument 26 via one of the output channels 22.

System controller 18 may further comprise a JTAG interface 64 for low-level access to its FPGA circuitry 19 and a control interface 65 for being connected to FPGA configuration device 28.

System controller 18 may also comprise an interface 66 for connecting feedback block 54 to external circuitry, such as a coprocessor 67. Interface 66 may e.g. be a PCI or AXI bus.

Coprocessor 67 comprises optimized hardware for fast numerical processing and may e.g. be a GPU or a processor dedicated to other types of processing, such as a Versal™ coprocessor by Xilinx Inc. This physical coprocessor may be implemented in the same chip as the FPGA, on the same PCB as the FPGA, or on another PCB.

More details about these components are provided below.

FPGA Configuration Device

FPGA configuration device 28 is typically a computer device running software that is configured to receive a "feedback block definition" and to program a section of the FPGA 19 of system controller 18 accordingly.

The section it programs typically corresponds to feedback block 54 or comprises feedback block 54.

Figure 3:
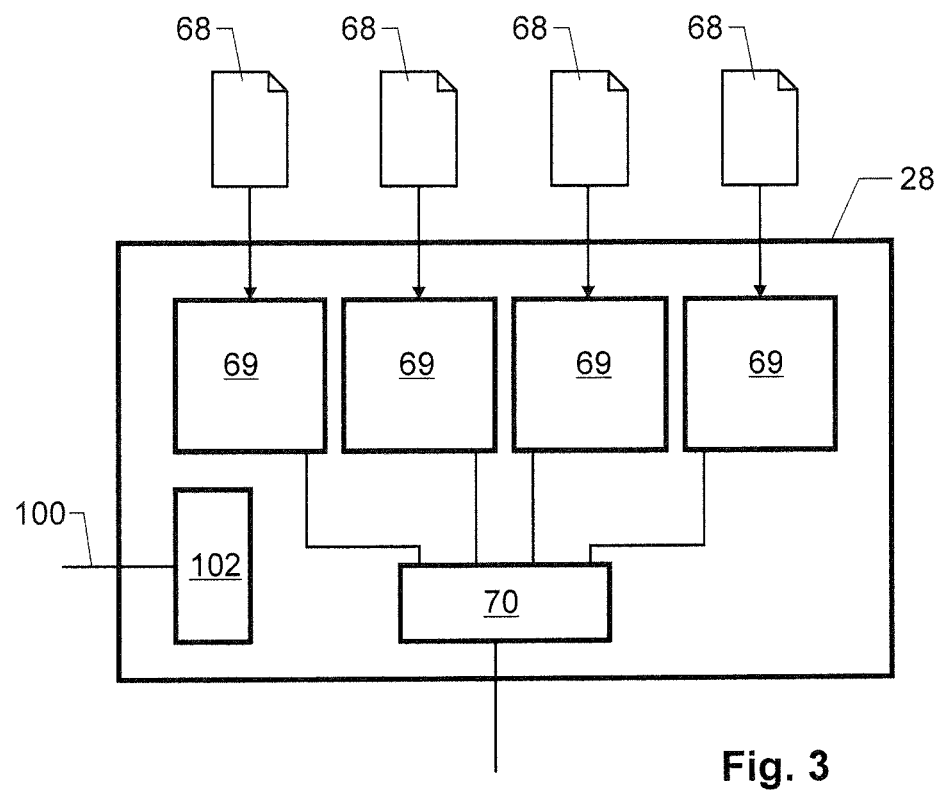
FIG. 3 is a more detailed view of a FPGA configuration device.

FIG. 3 shows a block diagram of an embodiment of FPGA configuration device 28. It typically supports different types of feedback block definitions 68, which are processed by suitable processing modules 69 to be converted into configuration information to be fed through an interface unit 70 to control interface 65 of system controller 18.

In the context of the present text, the different types of feedback block definitions 68 and their respective processing modules 70 are designated as "modes" of configuration device 28.

Advantageously, configuration device 28 is adapted to provide different modes, with the different modes being adapted to program different algorithms into feedback block 54 for connecting the registers 48 to the outputs 60 of feedback block 54. Depending on the task to be achieved, the user can employ one or more of these modes for implementing feedback block 54.

In some embodiments, the feedback block definitions 68 may e.g. comprise at least one configuration dataset that is directly forwarded into registers configured in feedback block 54 for setting values therein.

In the following, some possible modes are described.

LUT-Mode:

Configuration device 28 may comprise an "LUT-mode". In this mode, it is adapted to program feedback block 54 to form a lookup table (LUT) storing a plurality of coefficients. The lookup table comprises a selection input connected to register bank 44 (i.e. to the data outputs 50 of the registers 48) and a result output connected to output interface 61.

Figure 4:
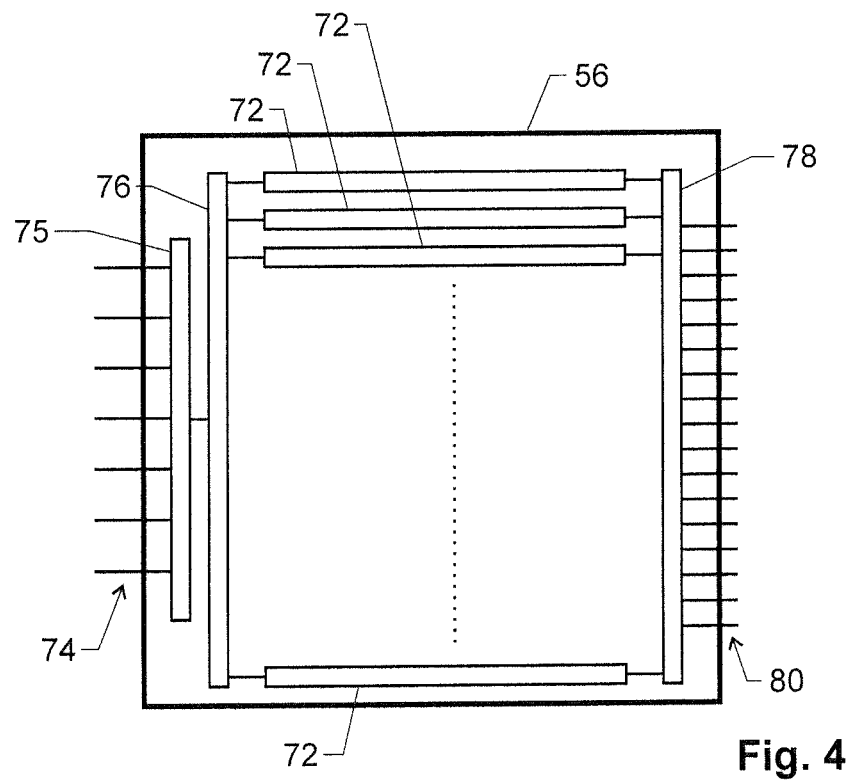
FIG. 4 shows an example of a lookup table.

An example for such a lookup table 56 is shown in FIG. 4. It comprises a plurality of storage cells 72, with each storage cell 72 storing a multibit value (a "coefficient"). Selection input 74 of lookup table 56 connects the data outputs 50 of at least a subset of the registers 48 to an address decoder 76, optionally via a switch 75. Switch 75 may be provided to select a subset of the registers 48 to be connected to address decoder 76. Address decoder 76 interprets the bit pattern at selection input 74 or as received from switch 75, i.e. at least a subset of the values from the registers, as an address for selecting a single one of the storage cells 72. The value in that storage cell is then fed via an output section 78 to a result output 80, which is connected to output interface 61.

Output section 78 and/or output interface 61 define which bits of the registers 48 are fed to which control instruments 26.

In the LUT-mode, block definition 68 may e.g. comprise a list of the registers 48 to be connected to the table, a list of the output channels 22 to be connected to the table, and the coefficients to be stored in the storage cells 72. As mentioned, block definition 68 may also comprise a configuration dataset to be directly forwarded into the storage cells 72.

The values of the coefficients may be pre-computed on a classical computer.

ML-Mode:

Configuration device 28 may comprise an "ML-mode". In this mode, it is adapted to program feedback block 54 as a machine learning model, e.g. in cooperation with coprocessor 67. Various suitable models of this type are known to the skilled person, in particular artificial neural networks. Other models, though, may be used as well, in particular support vector machines, and/or also decision trees, regression analyzers, Bayesian networks, or genetic algorithms.

The model can be implemented in the circuitry of the FPGA 19 and/or in external circuitry, such as coprocessor 67.

In ML-mode, block definition 68 may e.g. comprise a specification of the type of model and its configuration parameters as well as lists of the registers 48 and of the output channels 22 to be connected to it.

The model may be trained on a classical computer. For example, for a particular quantum processor with its specific error map, a minimization algorithm may be approximated that determines the most likely underlying error based on readout of ancilla qubits.

FPGA Direct Programming Mode:

Configuration device 28 may comprise an "FPGA direct programming mode". In this mode, block definition 68 comprises a gate-level FPGA instructions for programming the section of the FPGA 19 corresponding to feedback block 54. For example, block definition 68 may comprise VHDL instructions for defining the configuration of the FPGA circuitry of feedback block 56.

In this programming mode, the user may e.g. specify multipliers, adders, memory cells, logic elements, multiplyaccumulators, DSP slices, switches and/or multiplexers to be implemented in feedback block 54.

Coprocessor Programming Mode:

Configuration device 28 may comprise a "coprocessor programming mode". In this mode, it is adapted to program feedback block 54 to send data derived from at least part of the registers 48 to coprocessor 67 for processing and to receive at least some of the results back from coprocessor 67 and send them to output interface 61.

In this mode, block definition 68 may e.g. comprise information indicative of the register values to be forwarded to coprocessor 67 and how to dispatch the results returned from coprocessor 67 to output interface 61. Block definition 68 may also comprise code to be executed by coprocessor 67—alternatively, said code may be sent through different means to coprocessor 67.

Routing Mode:

Configuration device 28 may comprise a "routing mode". In this mode, it connects individual registers 48 to one or more of the outputs 60. The control instruments 26 may e.g. then use this for performing conditional execution of waveform generation during qubit state preparation of quantum processor 10.

In this mode, block definition 68 may e.g. comprise a list of registers and outputs to be interconnected.

Boolean Mode:

Configuration device 28 may comprise a "Boolean mode". In this mode, it connects at least some of the registers 48 to at least some of the outputs 60 using Boolean operations, e.g. setting a given output to 1 only if two given registers have values of 1.

In this mode, block definition 68 may e.g. comprise a Boolean description of the dependence of at least some of the outputs 60 on the values of at least some of the registers 48.

Optimization Mode:

Configuration device 28 may comprise an "optimization mode". In this mode, it programs at least part of the feedback block 54 (optionally with the help of coprocessor 67) to form a numerical optimizer, i.e. a numerical minimizer or maximizer, for finding a minimum or maximum of a function depending on a plurality of values, in particular on at least some register values.

The optimizer is advantageously adapted to find the minimum or maximum of a linear combination of a plurality of values. Such linear optimizers can be implemented using linear, non-iterative algorithms, which makes them fast and particularly suited to be implemented in feedback block 54.

In this mode, block definition 68 may e.g. comprise a description of the function to be minimized or maximized.

The optimizer may e.g. be adapted to determine the most likely underlying error based on the readout data from ancilla qubits and/or to determine a specific control pulse that exhibits the highest gate fidelity and/or the readout pulse that exhibits the highest readout fidelity.

Configuration device 28 may be adapted to generate structures, in particular logical structures, in the FPGA that comprise registers. Then, at least some of the data from the block definitions 68 may be directly routed into these registers, e.g. as a configuration dataset as mentioned above.

Configuration device 28 may be adapted to structure feedback block 54 only. But may e.g. also be adapted to structure register bank 44.

It must be noted that, typically, configuration device 28 comprises at least two of the modes above, in particular at least three of them, in particular all of them. In particular, it advantageously comprises at least the LUT-mode and the routing mode and/or the LUT-mode and the FPGA direct programming mode and/or the LUT-mode and the ML-mode.

The routing mode is particularly important, e.g. for the setup phase, and configuration device 28 therefore advantageously comprises at least the routing mode combined with at least one of the other modes.

Further, it must be noted that FPGA configuration device 28 may be adapted to operate in several modes when programming a single instance of system controller 18. For example, it may form a lookup table in LUT-mode for connecting a first subset of the registers 48 with a first subset of the outputs 60, in coprocessor programming mode for using coprocessor 67 to connect a second set of the registers 48 to a second sets of the outputs 60, and/or in routing mode to interconnect some registers with some output values e.g. for state initialization.

In more general terms, FPGA configuration device 28 may be adapted to program a first part of feedback block 54 in a first mode and a second part of feedback block 54 in a second mode different from the first mode.

In one embodiment, configuration device 28 may be configured to merge the feedback block definition(s) 68 with e.g. VHDL definitions describing the circuitry of at least input interface 42, register bank 44, and output interface 61 in order to generate FPGA configuration data of at least part or the whole FPGA circuitry 19 of system controller 18. For example, it may convert feedback block definition 68 to VHDL and then compile it, together with the VHDL definitions of the other components, whereupon it programs the FPGA 19 accordingly.

Readout Instruments

Figure 5:
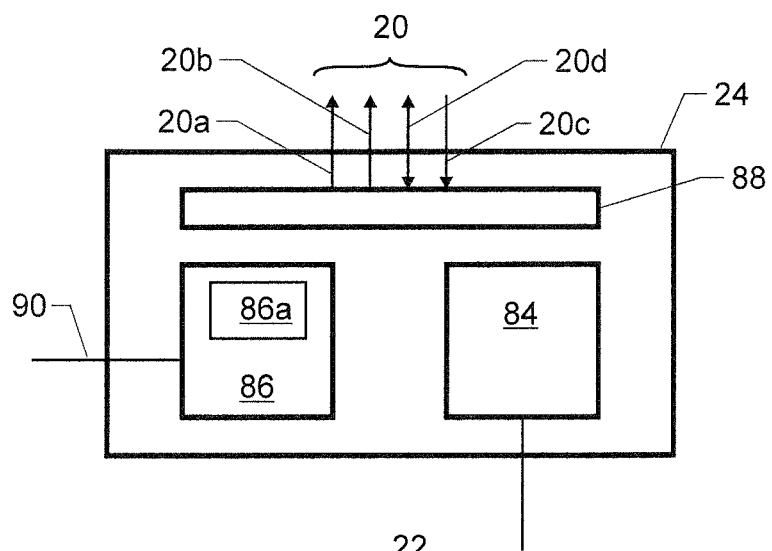
FIG. 5 is a more detailed view of an embodiment of a readout instrument.

FIG. 5 shows an embodiment of a qubit readout instrument 24. It comprises qubit interface circuitry 84 for interfacing with quantum processor 10, e.g. comprising analog circuitry and at least one A/D converter. It further comprises a control section 86 as well as an interface section 88.

Interface section 88 is adapted to communicate through at least one of the input channels 20, which includes a (logical of physical) sub-channel 20a for the address data and a sub-channel 20b for the measurement data.

Each input channel 20 advantageously also comprises a system clock line 20c with a master clock common to all readout instruments 24 and all control instruments 26 as well as a synchronization sub-channel 20d providing a common time base to all readout instruments 24 and all control instruments 26.

Each input channel 20 advantageously also provides handshake functionality. In particular, it may carry a 'ready signal' indicative of the fact that the instrument is ready for new instructions.

Control section 86 comprises at least one memory 86a for storing at least one address of a register the measurement data is to be sent to. Memory 86a may also store further operating instructions.

Readout instrument 24 may also comprise a configuration input 90 connected to system configuration device 30. In particular, readout instrument 24 may be adapted to receive instructions through configuration input 90 for changing the address and/or operating instructions in memory 86a. This is described in more detail below.

Advantageously, readout instrument 24 may be adapted to test one or more qubits from quantum processor 10 and, if they fulfill a certain condition, to write data into a specific register.

Suitable programming can be entered into storage 86a through configuration input 90.

Control Instruments

Figure 6:
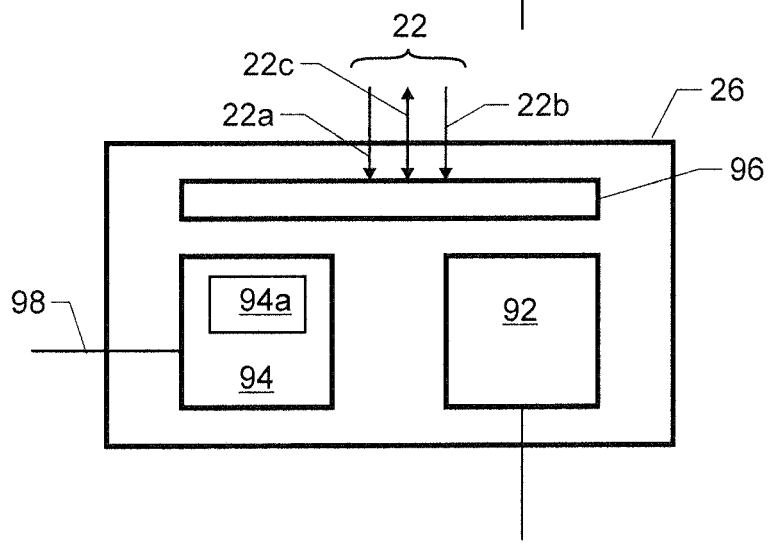
FIG. 6 is a more detailed view of an embodiment of a control instrument.

FIG. 6 shows an embodiment of a qubit control instrument 26. It comprises qubit interface circuitry 92 for interfacing with quantum processor 10, e.g. comprising at least one D/A converter and analog circuitry. It further comprises a control section 94 as well as an interface section 96.

Interface section 96 is adapted to communicate through one of the output channels 22, which includes a (logical or physical) sub-channel 22a for the data from feedback block 54.

Each output channel 22 advantageously also comprises a system clock line 22b with the master clock common to all readout instruments 24 and all control instruments 26 as well as a synchronization sub-channel 22c providing a common time base to all readout instruments 24 and all control instruments 26.

Output channel 22 may e.g. be adapted to transmit multibit values to each control instrument 26.

Each output channel 22 advantageously also provides handshake functionality. In particular, it may carry a 'ready signal' indicative of the fact that the instrument is ready for new instructions.

Control section 94 comprises at least one memory 94a for storing configuration data.

Control instrument 26 also comprises a configuration input 98 connected to system configuration device 30 as described below. In particular, control instrument 26 may be adapted to receive instructions through configuration input 90 for changing its operating instructions.

Advantageously, control instrument 26 may be adapted to test bits in the multibit value it received through its output channel 22 and to conditionally generate specific waveforms by means of interface circuitry 92.

Suitable programming can be entered into storage 94a through configuration input 98.

System Configuration Device

System configuration device 30 is adapted to program the readout instruments 24 and the control instruments 26, i.e. to change the settings in their memories 86a and 94a.

In the embodiment of FIG. 1, system configuration device 30 is connected to the configuration inputs 90 and 98. However, it may also communicate with the readout instruments 24 and the control instruments 26 through system controller 18.

Further, in the shown embodiment, system configuration device 30 is also connected to system controller 18 for controlling experiment controller 41 (see FIG. 2).

System configuration device 30 may comprise a system compiler 31 adapted to convert an (e.g. textual) experiment description into a configuration to be sent to the readout instruments 24, control instruments 26, and/or system controller 18. The experiment description may e.g. specify at least one, in particular several, of the following experimental settings:

pulse shapes to be generated by the control instruments 26,
pulse sequences to be generated by the control instruments, optionally as synchronized by experiment controller 41,
pulse times of the pulses generated by the control instruments 26,
readout times for the readout instruments 24,
register addresses for the register data from the readout instruments 24.

System configuration device 30 may 16 may further be adapted to send "experiment flow data" to synchronization device 40, i.e. to experiment controller 41. Experiment controller 41 is adapted to operate the control instruments 26 and the readout instruments 24 over a series of e.g. 1000 control and readout cycles of quantum processor 10 as a function of this experiment flow data.

System configuration device 30 may then e.g. modify the experiment and then order experiment controller 41 to execute another series of control and readout cycles.

System configuration device 30 is agnostic towards the specific configuration of feedback block 54.

Advantageously, though, system configuration device 30 is provided with at least "delay information" describing the delay between the input channels 20 and the output channels 22, which depend on the configuration of feedback block 54. This e.g. allows to synchronize the operations of the control instruments 26 with the ones of the readout instruments 24, obviating the need of "wait" operations in the control instruments 26.

For this purpose, system configuration device 30 may be connected to FPGA configuration device 28 by means of a communication channel 100.

FPGA configuration device 28 can then calculate, in a feedback block parameter estimator 102 (cf. FIG. 3), the delay information based on the currently selected feedback control definition(s) 68 and send this information to system configuration device 30. Feedback block parameter estimator 102 can e.g. use timing analysis of FPGA 19 for calculating the delay information. Timing analysis software is e.g. provided as software packages by FPGA manufacturers for the FPGA devices they sell.

Another item of information that may be useful for the operation of system configuration device 30 is a "sensitivity list", which describes which output 60 depends on which input 57.

In one example, system configuration device 30 may be adapted to receive an experiment description for a given control instrument 26. A (non-limiting) example of such an experiment description for a certain control instrument 26 may e.g. look like this:

if (condition[4]) playWave(A);
else play Wave(B);

When compiling these instructions, configuration device 30 transmits programming to memory 94a of the given control instrument, which, when being executed by the control instrument 26, makes it test bit 4 of the value it received through its output channel 22. If said bit is 1, it causes its interface circuitry 92 to play a first waveform. A, otherwise a second waveform B.

In another illustrative example, system configuration device 30 may be adapted to receive an experiment description for a given readout instrument 24 e.g. as follows:

measure(qubits={0,0,1,1,0}, reg={0,0,0x10,0x11, 0});

When compiling these instructions, configuration device 30 transmits programming to memory 86a of the given readout instrument 24, which—when executed by the readout instrument—makes it read out qubits 2 and 3 of the available 5 qubits. It then sends the two binary readout results to addresses 0x10 and 0x11 through its readout channel 20 to system controller 18, which causes the result to be written into the register with address 16 and 17 in register bank 44 and the respective new data signals are strobed.

System Architecture

Advantageously, the readout instruments 24 and the control instruments 26 are devices separate from system controller 18. Advantageously, the channels 22 and 20 are serial channels for simpler connection.

Also, FPGA configuration device 28 is advantageously a device separate from system controller 18, e.g. a regular computer or dedicated hard- and software.

Also, system configuration device 30 is advantageously a device separate from system controller 18 and also separate from the instruments 24, 26. It may e.g. also be a regular computer or dedicated hard- and software.

FPGA configuration device 28 and system configuration device 30 may be separate devices or implemented as a common device.

Advantageously, two devices are considered to be "separate" if they are connected by user-separable plug-in connectors only and/or if they are connected by a plug-in bus system, such as by a PXI backplane.

Notes

The term "system" as used herein denotes an apparatus with hardware as well as suitable software to be adapted and structured to carry out the functionality described.

The present system allows the user to specify the feedback block definition(s) 68 only, without having to specify the configuration of the rest of the FPGA circuitry 19 implemented by system controller 18, which greatly simplifies the task of configuring the system controller 18.

In other words, the FPGA configuration device 28 is advantageously adapted to receive information (through feedback block definition 68) specifying the configuration of feedback block 54 only and then to configure the FPGA(s) 19 of system controller 18 to implement not only feedback block 54 but also at least input interface 42, register bank 44, and output interface 61. It may e.g. do this by merging the feedback block definition(s) 68 with FPGA configuration data implementing the parts 42, 44, and 61 and then reprogramming the whole FPGA 19, and/or by reprogramming the feedback block 54 of the FPGA(s) 19 while leaving the FPGA parts implementing the input interface 42, register bank 44, and output interface 61 unchanged.

While there are shown and described presently preferred embodiments of the invention, it is to be distinctly understood that the invention is not limited thereto but may be otherwise variously embodied and practiced within the scope of the following claims.

The invention claimed is:

1. A system for controlling a quantum processor comprising
    a system controller having a plurality of input channels and output channels, wherein each input channel carries measurement data,
    a plurality of qubit readout instruments connected to the input channels,
    a plurality of qubit control instruments connected to the output channels,
    wherein said system controller comprises at least one FPGA forming at least
    a) an input interface connected to said input channels,
    b) a register bank comprising a plurality of registers connected to said input interface,
    c) a programmable feedback block having inputs connected to said register bank and outputs,
    d) an output interface connecting the outputs of the programmable feedback block to the output channels,
    wherein the input interface is adapted to send the measurement data the registers,
    wherein said system further comprises an FPGA configuration device connected to said at least one FPGA, wherein said FPGA configuration device is adapted to receive at least one feedback block definition, and program a section of said FPGA to form said feedback block in accordance with said feedback block definition.

2. The system of claim 1 wherein said FPGA configuration device has several modes of operation, wherein the different modes are adapted to program the feedback block to implement different algorithms for connecting the registers to the outputs of the feedback block.

3. The system of claim 2 wherein said FPGA configuration device has a LUT-mode, wherein, in said LUT-mode, said FPGA configuration device is adapted to program said section to form a lookup table storing a plurality of coefficients, wherein said lookup table comprises a selection input connected to said register bank and a result output connected to said output interface.

4. The system of claim 2 wherein said FPGA configuration device has an ML-mode, wherein, in said ML-mode, said FPGA configuration device is adapted to program said section to implement a machine learning model, and in particular wherein said machine learning model implements at least one of an artificial neural network, a decision tree, a support vector machine, a regression analyzer, a Bayesian network, and a genetic algorithm.

5. The system of claim 2, wherein said FPGA configuration device has an FPGA direct programming mode, wherein, in said FPGA direct programming mode, said FPGA configuration device is adapted to receive gate-level instructions for programming the section of the FPGA, and in particular wherein said FPGA configuration device is adapted to receive a set of VHDL instructions and to use said set for programming the gates in said section.

6. The system of claim 2 further comprising a coprocessor connected to said FPGA, wherein said FPGA configuration device has a coprocessor programming mode, wherein, in said coprocessor programming mode, said FPGA configuration device is adapted to program said section to exchange data with said coprocessor.

7. The system of claim 2, wherein said FPGA configuration device has a routing mode, wherein in said routing mode said FPGA configuration device is adapted to program said section to connect individual registers to one or more outputs of said feedback block.

8. The system of claim 2, wherein said FPGA configuration device has a Boolean mode, wherein in said Boolean mode said FPGA configuration device is adapted to program said section to connect at least some of the registers to at least some of the outputs-using Boolean operations.

9. The system of claim 2, wherein said FPGA configuration device has an optimization mode, wherein in said optimization mode said FPGA configuration device is adapted to program said section to implement a numerical optimizer, in particular a linear numerical optimizer.

10. The system of claim 2 wherein said FPGA configuration device is adapted to program a first part of the feedback block in a first mode and a second part of the feedback block in a second mode different from the first mode.

11. The system of claim 1 wherein said FPGA configuration device is adapted to
    merge said feedback block definition with information descriptive of at least the input interface, the register bank, and the output interface in order to generate FPGA configuration data, and
    program said at least one FPGA according to said FPGA configuration data in order to form said input interface, said register bank, said feedback block, and said output interface in said at least one FPGA.

12. The system of claim 1 wherein
each input channel carries address data in addition to said measurement data,
said input interface comprises address decoder circuitry connected to said input channels, and
the input interface is adapted to send the measurement data to one of the registers as specified by the address data.

13. The system of claim 1 further comprising a system configuration device connected to said readout instruments and said control instruments and adapted to program said readout instruments and said control instruments.

14. The system of claim 12 further comprising a system configuration device connected to said readout instruments and said control instruments and adapted to program said readout instruments and said control instruments,
wherein each readout instrument comprises at least one memory storing an address to be transmitted as address data together with the measurement data on the input channel connecting the readout instrument to the system controller, and wherein said system configuration device is adapted to write the address into said address memory.

15. The system of claim 13 wherein said system configuration device comprises a delay input connected to said FPGA configuration device for receiving a value descriptive of a time delay between the input channels and the output channels in a current configuration of said system controller,
and wherein said FPGA configuration device is adapted to calculate said time delay as a function of said feedback control definition.

16. The system of claim 1 wherein said system controller further comprises a synchronization device and wherein each input channel and output channel further carries a system clock line and a synchronization channel, wherein said synchronization device is adapted to synchronize said control instruments and said readout instruments by said system clock lines and said synchronization channels.

17. The system of claim 16 further comprising a system configuration device connected to said readout instruments and said control instruments and adapted to program said readout instruments and said control instruments,
wherein said system configuration device is connected to the synchronization device and adapted to send experiment flow data to the synchronization device, and wherein the synchronization device is adapted to operate said control instruments and said readout instruments over a series of control and readout cycles of said quantum processor as a function of said experiment flow data.

18. The system of claim 1 wherein each register comprises a register data output and a new value output, both of which are connected to said feedback block, wherein
said register data output carries a signal indicative of a value stored in the register, and
said new value output carries a signal indicative of a write operation in the register.

19. The system of claim 18 wherein the feedback block is adapted to initiate a recalculation if at least some of the new value outputs flag a write operation.

20. The system of claim 19 wherein the feedback block comprises a sensitivity list storing a sensitivity information indicative of a subset of the registers, wherein the feedback block is adapted to initiate the recalculation if a given combination of the new value outputs of the registers of the subset flags a write operation.

21. The system of claim 20 wherein said FPGA configuration device is adapted to set the sensitivity information, in particular as a function of said feedback block definition.

22. The system of claim 1 wherein the FPGA configuration device is adapted to receive information specifying the configuration of the feedback block only and then to configure the at least one FPGA of the system controller to implement not only the feedback block but also the input interface, the register bank, and the output interface.

23. Use of the system of claim 1 for controlling a quantum processor.

24. A system for controlling a quantum processor comprising
a system controller having a plurality of input channels and output channels, wherein each input channel carries measurement data,
a plurality of qubit readout instruments connected to the input channels,
a plurality of qubit control instruments connected to the output channels,
a system configuration device connected to said readout instruments and said control instruments and adapted to program said readout instruments and said control instruments,
wherein said system controller comprises at least one FPGA forming at least
a) an input interface connected to said input channels,
b) a register bank comprising a plurality of registers connected to said input interface,
c) a programmable feedback block having inputs connected to said register bank and outputs,
d) an output interface connecting the outputs of the programmable feedback block to the output channels,
wherein the input interface is adapted to send the measurement data the registers,
wherein said system further comprises an FPGA configuration device connected to said at least one FPGA,
wherein said FPGA configuration device is adapted to receive at least one feedback block definition, and
program a section of said FPGA to form said feedback block in accordance with said feedback block definition,
wherein said system configuration device comprises a delay input connected to said FPGA configuration device for receiving a value descriptive of a time delay between the input channels and the output channels in a current configuration of said system controller,
and wherein said FPGA configuration device is adapted to calculate said time delay as a function of said feedback control definition.

25. A system for controlling a quantum processor comprising
a system controller having a plurality of input channels and output channels, wherein each input channel carries measurement data,
a plurality of qubit readout instruments connected to the input channels,
a plurality of qubit control instruments connected to the output channels,
wherein said system controller comprises at least one FPGA forming at least
a) an input interface connected to said input channels,
b) a register bank comprising a plurality of registers connected to said input interface,
c) a programmable feedback block having inputs connected to said register bank and outputs, d) an output interface connecting the outputs of the programmable feedback block to the output channels, wherein the input interface is adapted to send the measurement data the registers, wherein said system further comprises an FPGA configuration device connected to said at least one FPGA, wherein said FPGA configuration device is adapted to receive at least one feedback block definition, and program a section of said FPGA to form said feedback block in accordance with said feedback block definition, wherein each register comprises a register data output and a new value output, both of which are connected to said feedback block, wherein said register data output carries a signal indicative of a value stored in the register, and said new value output carries a signal indicative of a write operation in the register.

26. The system of claim 25 wherein the feedback block comprises a sensitivity list storing a sensitivity information indicative of a subset of the registers and wherein the feedback block is adapted to initiate the recalculation if a given combination of the new value outputs of the registers of the subset flags a write operation.

\* \* \* \* \*